Sept. 2, 1924.
W. H. MORGAN
METAL WHEEL
Filed May 5, 1922
1,507,083
2 Sheets-Sheet 1
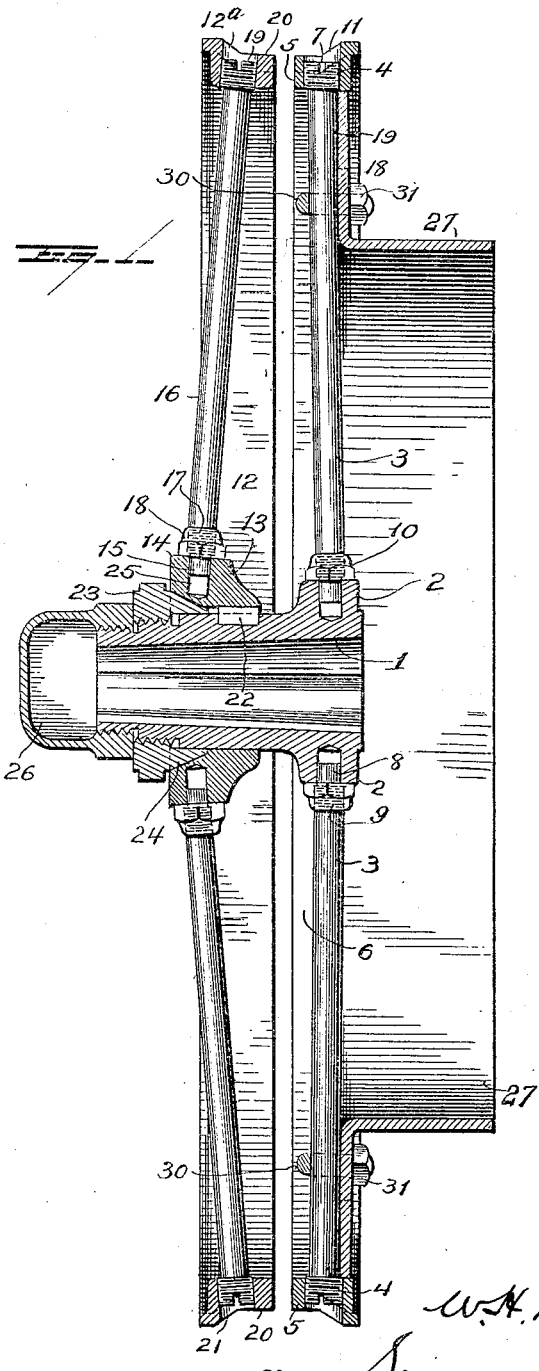
Inventor
W. H. Morgan
By Seymour & Bright
Attorneys Sept. 2, 1924.  W. H. MORGAN  1,507,083
METAL WHEEL
Filed May 5, 1922  2 Sheets-Sheet 2
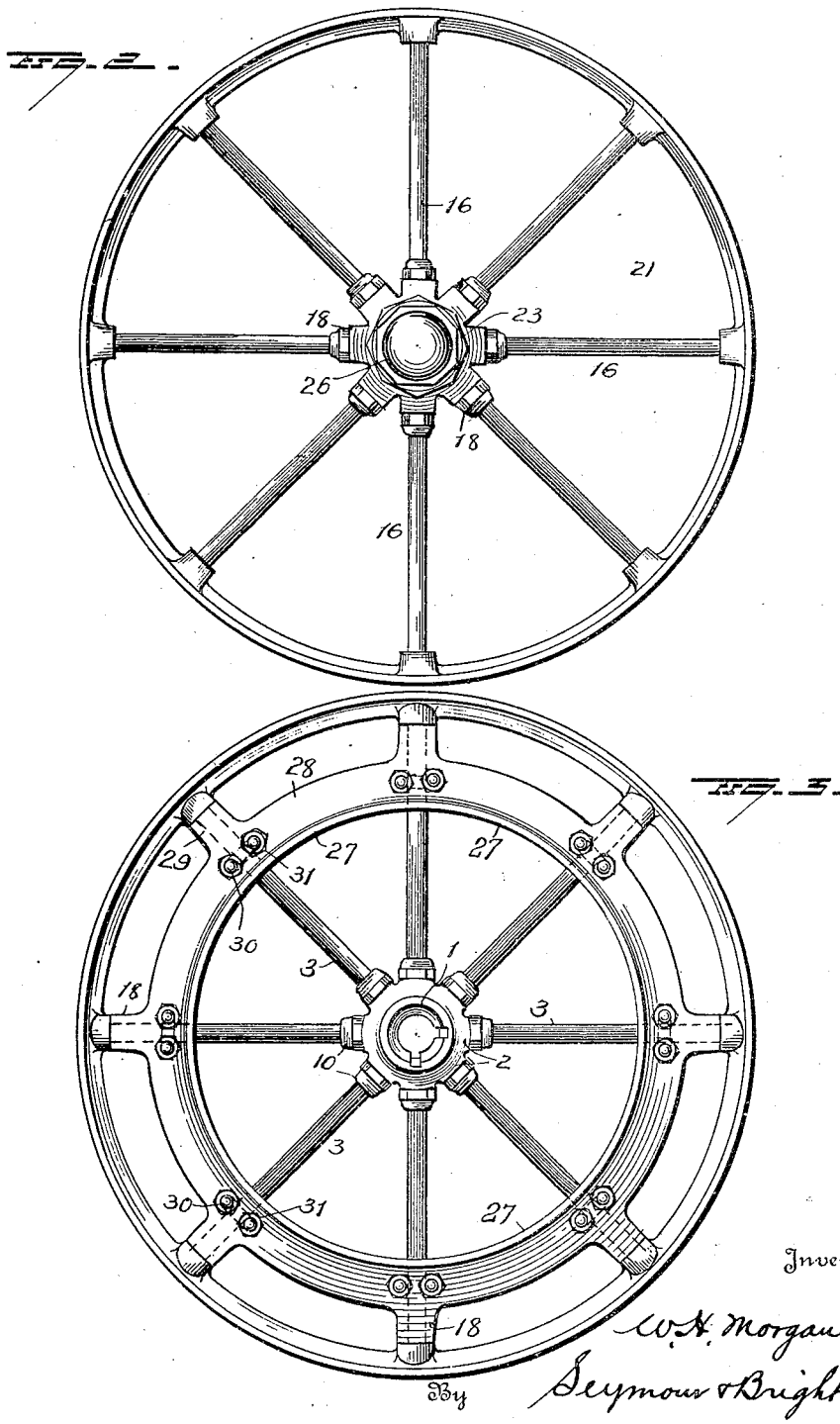

Patented Sept. 2, 1924.

1,507,083

UNITED STATES PATENT OFFICE.

WILLIAM HENRY MORGAN, OF ALLIANCE, OHIO.

METAL WHEEL.

Application filed May 5, 1922. Serial No. 558,563.

*To all whom it may concern:*

Be it known that I, WILLIAM H. MORGAN, a citizen of the United States, and a resident of Alliance, in the county of Stark and State of Ohio, have invented certain new and useful Improvements in Metal Wheels; and I do hereby declare the following to be a full, clear, and exact description of the invention, such as will enable others skilled in the art to which it appertains to make and use the same.

This invention relates to improvements in metal wheels, and more particularly to such as are adaptable for use with self-propelled vehicles employing demountable rims and tires,—one object of the invention being to provide in a two-part wheel structure, single securing means whereby the rim will be held firmly in place on the felly and which will cause the pressure to be evenly distributed around the entire circumference of the rim.

A further object is to provide simple and efficient spoke construction between the hub and felly members.

With these and other objects in view, the invention consists in certain novel features of construction and combinations of parts as hereinafter set forth and pointed out in the claims.

In the accompanying drawings; Figure 1 is a section of a rear driving wheel showing an embodiment of my invention; Figure 2 is a view in elevation of a front wheel, and Figure 3 is an inner side face view of a rear driving wheel.

The hub of the rear driving wheel is represented at 1 and may be made of cast or forged metal, preferably cast, and is provided with a tapering bore adapted to be keyed to the axle in the usual and well known manner. This hub is provided at its inner end with an annular series of socketed bosses 2 for the reception of the inner ends of spokes 3, the latter being made in the form of rods and are made with threaded head portions 4 to screw through interiorly threaded bosses 5 projecting inwardly from a felly member 6 and said head portions 4 at the outer ends of the rod spokes are provided with slots 7 to receive a screw driver. The spokes 3 are formed at their inner ends with short shanks 8 preferably less in diameter than the diameter of the body of each spoke to freely enter the socketed bosses 2 on the hub, and adjacent to such shank portions the spokes are threaded, as at 9 for the accommodation of jam nuts 10 which bear against said bosses 2. In assembling the hub 1, felly member 6 and spokes 3, the latter may be readily passed through the bosses 5 on the felly member and as the shanks 8 at the inner end of a spoke enters a socketed boss 2 on the hub, the threaded head 4 of the spoke will be screwed into the boss 5 on the felly member until said head becomes housed in said boss,—after which the jam nut 10 will be tightened so as to bear firmly against the end of a hub boss 2. In this manner, the hub, felly member and spokes will be securely united, but at the same time, any one or more of the spokes may be easily adjusted, tightened or removed.

The felly member 6 may be either cast or forged and is provided on its inner side with an inwardly projecting inclined portion 11 which is continuous around the wheel, and against which the demountable rim (not shown) rests and by which it is retained against inward displacement.

The rim clamping section of the wheels includes a felly section 12 having a beveled portion $12^a$ to engage the demountable rim said felly member 12 being disposed near but spaced somewhat from the felly member 6, and a ring shaped member 13 is machined to fit and has sliding movement on the hub 1, said member 13 having an annular series of socketed bosses 14 to receive the shanks 15 on the rod spokes 16 and the latter are threaded at 17 to receive jam nuts 18 and the outer ends of said rod spokes are provided with threaded heads 19 to enter interiorly threaded bosses 20 on the felly member 12. It will be observed that the felly sections 6 and 12 are the same in construction and that the spoke connections between the felly member 12 and the ring 13 are the same as the spoke connections between the felly member 6 and the hub 1.

The respective sections of the wheel are so mounted that the spokes of one section shall alternate with the spokes of the other section so that when the outer section or clamping section is removed, ample and at least double space will be provided between the spokes of the inner section for facilitating access to parts to be adjusted or lubricated.

The hub 14 of the rear or driving wheel is to be keyed to the axle in the usual and well known manner, so that no change or alteration will be required in the standard makes of cars to receive the wheels while the front wheel 21 shown in Figure 2 may be mounted loosely in the customary manner, and the outer section of each wheel is keyed to the hub as at 22 for properly locating the spokes of the two sections, and in the case of the rear wheel, for positively driving the outer or clamping section, thus preventing any lost motion between the parts; adding strength in transmitting power from the axle to the tire, and compelling the proper assembling of the parts.

The portion of the hub on which the ring or member 13 is mounted is approximately cylindrical so that the ring has a free sliding but close fit thereon and it is adjusted and held in place by a clamping or lock nut 23 which has preferably right hand threads screwed on the hub, said nut also having a tapering or wedge-portion 24 to enter a similarly shaped recess 25 in the ring or member 13. The lock nut is held in place by a screw cap 26 which is of ordinary construction and screwed to the extreme end of the hub, the cap being cup-shaped to house the axle nut (not shown).

The spokes 3 of the inner section of the wheel are inclined outwardly from the hub to the felly section 6 and the spokes 16 of the outer wheel section have a greater inclination inwardly from the hub to the felly section 12 for the purpose of giving lateral strength to the wheel in the event of skidding, turning corners, striking stones or other obstructions and generally for preventing the spokes from bending under any side shocks to which the tire may be subjected.

A brake drum 27 is provided for the rear or driving wheel, and this brake drum is made with an annular flange 28 which rests against the spokes 3 of the inner section of the wheel and from this flange, fingers 29 project radially to the bosses 5 of the felly member 6. The brake drum is secured in place by U-bolts 30 which pass through the drum flange 28 and embrace the spokes 3, nuts 31 being screwed on the inner end portions of the respective arms of each of said U-bolts.

It is evident that slight changes might be resorted to in the relative arrangement of parts shown and described without departing from the spirit and scope of my invention and hence I would have it understood that I do not wish to confine myself to the exact construction and arrangement of parts shown and described.

Having fully described my invention what I claim as new and desire to secure by Letters Patent, is:—

1. A metal wheel comprising a hub provided with an annular series of socketed bosses, a felly provided with interiorly threaded bosses, spokes each having approximately the same diameter approximately from end to end, whereby said spokes are insertable through the bosses of the felly and adapted to enter the socketed bosses on the hub, said spokes having threaded heads screwed into the felly bosses, and jam nuts on said spokes to bear against the hub bosses.

2. A metal wheel comprising a hub having an annular series of socketed bosses, a felly provided with interiorly threaded bosses, spokes insertable through the felly bosses and having threaded heads to screw into said felly bosses, said spokes having shanks freely entering the hub sockets and having threaded portions near said shanks, and jam nuts on said threaded portions.

3. A metal wheel comprising a hub provided with an annular series of socketed bosses, an adjustable member on said hub and provided with an annular series of socketed bosses, two separate felly members, each having interiorly threaded bosses, spokes insertable through the bosses on one felly member and having threaded heads to screw into said last-mentioned bosses and adapted to enter the socketed hub bosses, spokes insertable through the bosses of the other felly member and having threaded heads to screw into said bosses, said last-mentioned spokes adapted to enter the bosses on the member which is adjustable on the hub, and jam nuts on all of said spokes adjacent to the socketed bosses.

4. A metal wheel comprising a hub, two felly members, a ring adjustable on the hub and having a tapering recess at one end, a nut threaded on the hub and having a tapering portion entering the tapering end of said adjustable member, two sets of spokes having threaded connection at their outer ends respectively with the respective felly members and connected at their inner ends respectively with the hub and said adjustable member.

5. In a metal wheel, the combination of a hub, a felly, rod spokes having threaded connection with the felly and removably connected with the hub, a brake drum having a flange lying against said rod spokes, and U-bolts securing the flange of the drum to said rod spokes.

6. In a metal driving wheel for a vehicle, the combination of a hub having socketed bosses, a felly having interiorly threaded bosses, rod spokes having parts seated in the hub bosses and having threaded heads screwed into the felly bosses, a brake drum having a flange resting against said rod spokes, said flange having fingers resting against said spokes and extending to the felly bosses, U-bolts embracing said spokes and passing through said flange, and nuts on said U-bolts.

In testimony whereof, I have signed this specification in the presence of two subscribing witnesses.

WILLIAM HENRY MORGAN.

Witnesses:
N. C. FETTERS,
M. E. JAMES.